United States Patent [19]

Nose et al.

[11] Patent Number: 5,432,346
[45] Date of Patent: Jul. 11, 1995

[54] RELATIVE POSITION CHANGE AMOUNT DETECTING APPARATUS HAVING BI-DIRECTIONAL PROBE WITH COMPENSATED MOVEMENT

[75] Inventors: Hiroyasu Nose, Zama; Toshimitsu Kawase, Atsugi; Toshihiko Miyazaki, Isehara; Takahiro Oguchi, Atsugi; Akihiko Yamano, Yokohama, all of Japan

[73] Assignee: Canon Kabushiki Kaisha, Tokyo, Japan

[21] Appl. No.: 996,889

[22] Filed: Dec. 24, 1992

Related U.S. Application Data

[63] Continuation of Ser. No. 518,412, May 3, 1990, abandoned.

[30] Foreign Application Priority Data

May 8, 1989 [JP] Japan ................................. 1-113691

[51] Int. Cl.⁶ ............................................. G11B 9/00
[52] U.S. Cl. .................................. 250/306; 250/307; 369/126
[58] Field of Search ............... 369/126, 101, 44.13, 369/44.27, 44.29, 54; 250/306, 307, 309, 310; 346/158

[56] References Cited

U.S. PATENT DOCUMENTS

| | | | |
|---|---|---|---|
| 4,618,767 | 10/1986 | Smith et al. | 250/306 X |
| 4,992,659 | 2/1991 | Abraham et al. | 250/306 |
| 4,998,016 | 3/1991 | Nose et al. | 250/306 |

FOREIGN PATENT DOCUMENTS

| | | |
|---|---|---|
| 0290647 | 11/1988 | European Pat. Off. . |
| 0304893 | 3/1989 | European Pat. Off. . |
| 0309236 | 3/1989 | European Pat. Off. . |
| 62-209302 | 9/1987 | Japan . |

OTHER PUBLICATIONS

D. W. Phol, et al, "Tracking Tunneling Microscopy", Review of Scientific Instrument, vol. 49, No. 6, pp. 840-842 (Jun. 1988).
"Differential Scanning Near-Field Microscope", IBM Technical Disclosure Bulletin, vol. 31, No. 2, pp. 467-468 (Jul. 1988).

Primary Examiner—Georgia Y. Epps
Assistant Examiner—Muhammad Edun
Attorney, Agent, or Firm—Fitzpatrick, Cella, Harper & Scinto

[57] ABSTRACT

Information detecting apparatus comprises a probe arranged to face an information medium so as to relatively move to the information medium with thereby detect information thereon, a first vibrating device for vibrating the probe relative to the information medium in a first direction parallel with the information medium, and a first movement detecting device for detecting a state of relative displacement of the probe for the information medium in the first direction on the basis of information obtained by the probe which is caused to vibrate by the first vibrating device. A second vibrating device vibrates the probe relative to the information medium in a second direction which is parallel with the surface of the information medium and crosses the first direction, and a second movement detecting device detects a state of relative displacement of the probe with the information medium in the second direction on the basis of information obtain by the probe which is caused to vibrate by the second vibrating device.

8 Claims, 8 Drawing Sheets

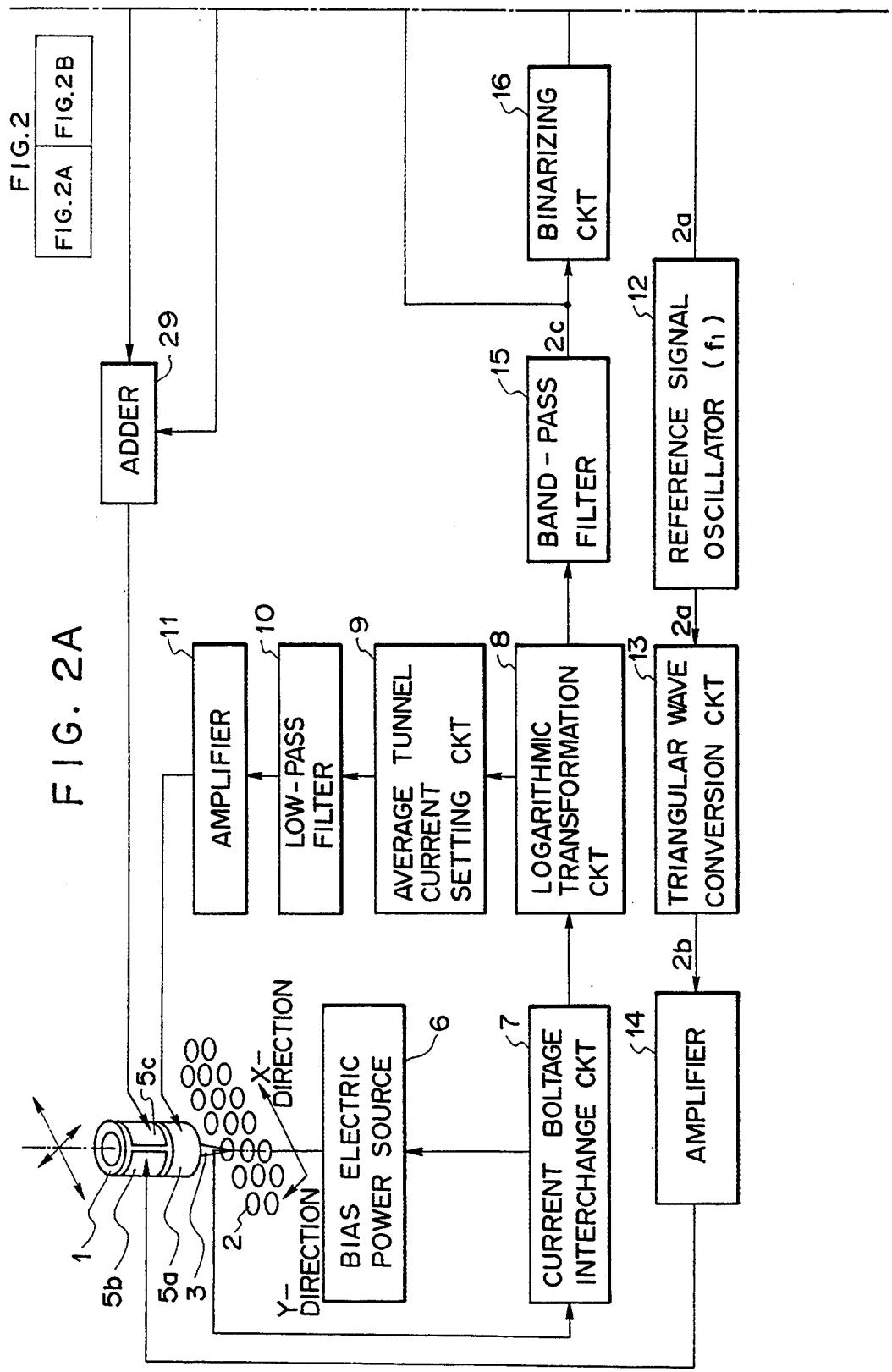

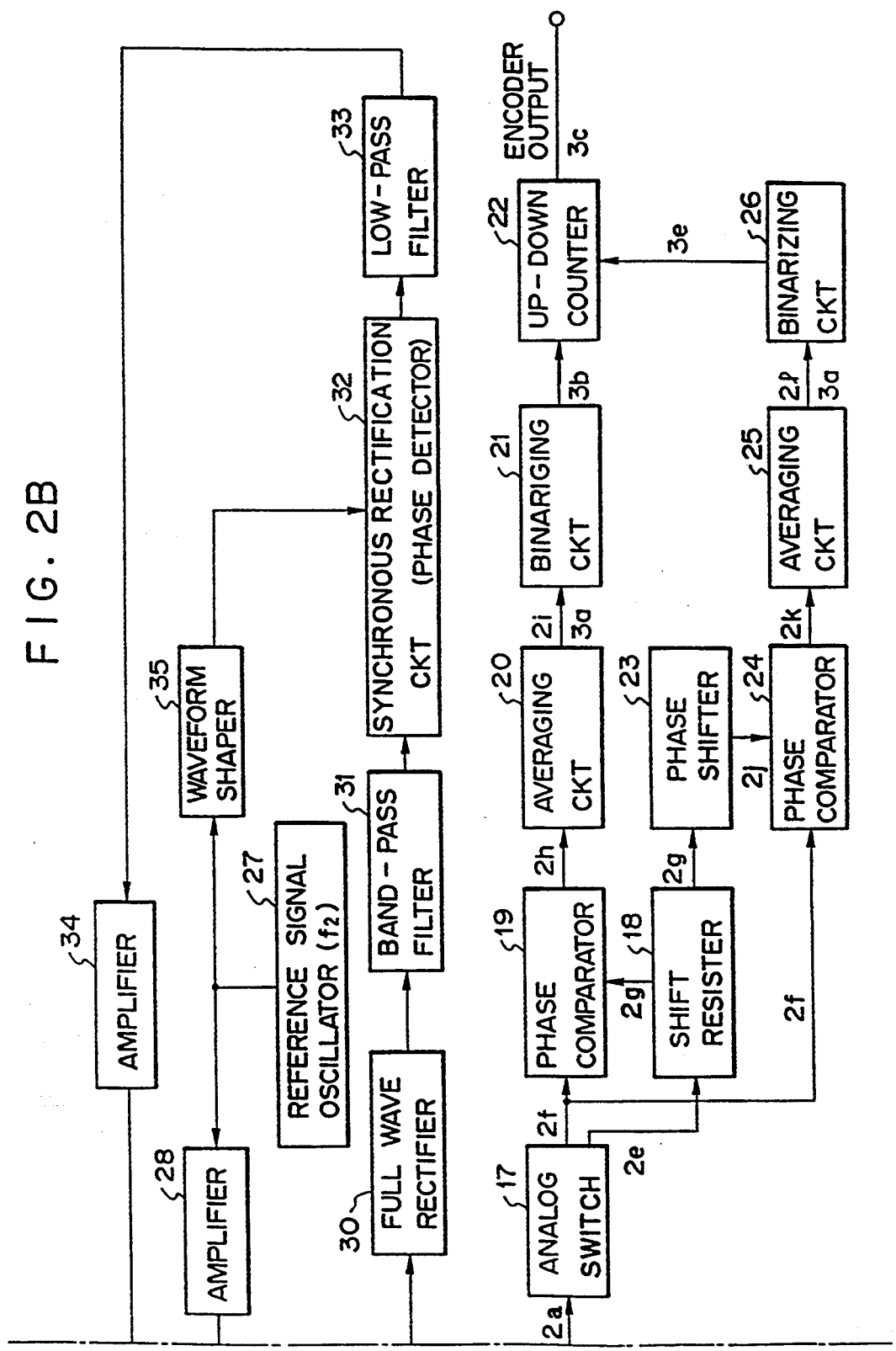

SECTION A—A'

RELATIVE POSITION CHANGE AMOUNT DETECTING APPARATUS HAVING BI-DIRECTIONAL PROBE WITH COMPENSATED MOVEMENT

This application is a continuation of application Ser. No. 07/518,412, filed May 3, 1990, now abandoned.

BACKGROUND OF THE INVENTION

1. Field of the Invention

The present invention relates to an information detecting apparatus. The present invention is suitable for encoders to be used for fine positioning, dimension measurement, metering, measuring of speed, positional information measurement in survey or the like, and in particular measurement control which requires a resolving power of an atomic order (several Å).

2. Related Background Art

Such encoders of this type conventionally comprised a reference scale which has information relating to a position and an angle and a detection means which moves relative to said reference scales to detect the information relating to a position and an angle. Such conventional encoders were classified into several types including an optical encoder, a magnetic encoder and an electrostatic capacity encodes and the like according to a type of said reference scale and said detection means. However, a resolving power of an atomic order could not be obtained yet by these encoders.

There was also proposed as an encoder capable of obtaining a high resolving power a displacement amount measuring device using the theory of a scanning tunnel microscope (STM) in which an atomic configuration represents a reference scale in Japanese Patent Laid-Open No. 62-209302.

In such a scanning tunnel microscope when a voltage is applied between a conductive sample and a conductive probe and the conductive sample and the conductive probe are moved within a distance of 1 nm or to each other around therebetween so as to flow a tunnel current, a tunnel current starts to run to change itself exponential-functionally according to said distance. When the distance from a surface of the sample which is made of a conductive material is kept constant to perform a two-dimensional scanning by using an acute probe, the tunnel current changes due to an atomic configuration or unevenness of the surface so as to obtain an image of the surface ("Solid state physics" vol. 22 No. 3 1987 pp. 176–186). Therefore, by using a sample having a regular atomic configuration or a periodical unevenness as a reference scale and by utilizing the fact that when a relative positional shift is generated between said reference scale and the probe along the direction of the reference scale, a tunnel current periodically changes corresponding to said positional shift, a displacement amount measuring apparatus having the resolving power of the atomic order on the level of several Å can be arranged.

However, though a crystal grating such as graphite (HOPG or Kish graphite) can be used as such reference scale in the above-mentioned conventional encoders, an actual STM image of graphite is observed as a triangular grating as shown in FIG. 1A and the tunnel current to be detected due to a locus of movement of a probe (indicated by an arrow in FIG. 1A) changes as shown in FIG. 1B. For example, in the case of the locus 7a when the probe is on a convex part of the crystal grating as shown, a signal having an excellent S/N with a large amplitude such as a waveform 7a' can be obtained. However, in the case of the locus 7b which is along lower parts (valley) in the grating, an amplitude of a signal is very small and its S/N is deteriorated, such as a waveform 7b'. Further, in the case of the locus 7c which is inclined to a direction of alignment of the crystal grating, a signal has large amplitude on portions mounting on convex parts and small amplitude on portions crossing lower parts as a signal 7c', which results in an output error.

When the displacement amount measuring device is actually arranged as the above-mentioned conventional example, it is desirable that a locus of the probe should pass the locus 7a in FIG. 7A. However, it was very difficult with a reference scale using a crystal grating that a probe and the reference scale should be held not to relatively shift from each other in a perpendicular direction (called the "Y direction") to a direction of detection of an amount of relative movement (called the "X direction") at Å order because there would be caused a temperature drift in a state in which said device is incorporated in the apparatus as a displacement amount measuring device, stress relaxation, a relative shift because of external vibration or the like, non-linearity of a relative movement support mechanism, an error of an angle between the direction of relative movement and the direction of the crystal grating of the reference scale, etc.

In the Patent Publication EPO 304893 A2 (which is corresponding to the U.S. Ser. No. 07/235,552) previously filed by the owner of the present application, there are separately disclosed an apparatus which vibrates a probe in a direction of relative movement between two objects so as to detect an amount and a direction of the relative movement between the probe and a medium in the relative movement direction, and an apparatus which vibrates a probe in a perpendicular direction to a relative movement direction between two objects so as to detect an amount and a direction of the relative movement between the probe and a medium in the perpendicular direction.

SUMMARY OF THE INVENTION

An object of the present invention is, taking the above defect of the prior art into consideration, to provide an apparatus for detecting minute information out of an information medium having information such as scale information by means of a probe, as a variation of the invention previously applied by the owner of the present application, in which apparatus an amount and a direction of relative movement between the probe and the information medium along a perpendicular direction to a direction of information detection can be detected by said probe while, for example, detecting an amount and a direction of relative movement between the information medium and the probe along the direction of information detection by means of the probe, and a device therefor can be simplified.

Another object of the present invention will be clarified later in a detailed description of embodiments of the present invention.

BRIEF DESCRIPTION OF THE DRAWINGS

FIGS. 2A and 2B are views showing a structure of an encoder according to an embodiment of the present invention;

DESCRIPTION OF THE PREFERRED EMBODIMENTS

In order to achieve the above object, according to the embodiment described later, an information detecting apparatus which comprises a conductive reference object, a conductive probe arranged in such a manner that the tip end of said probe is close to a surface of said reference object, means for effecting fine vibration at the relatively first oscillation frequency in a direction in which said reference object and said probe are relatively greatly displaced, means for applying a voltage between said reference object and said probe means for detecting a tunnel current running between said reference object and said probe and means for detecting a phase shift between a signal of the tunnel current detected by said detection means and a signal to be referenced to, and for thereby detecting an amount and a direction of relative movement between said reference object and the probe, further comprises means for effecting fine vibration at the relatively second oscillation frequency in a direction perpendicular to the direction in which said reference object and said probe are relatively greatly displaced, means for detecting an amount of a relative shift in a direction perpendicular to a direction of relative movement amount detection between said reference object and the probe on the basis of the tunnel current detected by said tunnel current detection means, and means for effecting relative movement so as to correct the amount of the relative shift between said reference object and said probe on the basis of said detection.

With such arrangement, when the probe is vibrated in a direction perpendicular to the direction of relative movement amount detection in an amplitude smaller than a width of a scale line of the reference scale and at a frequency sufficiently smaller than that in the direction of relative movement amount detection, an amplitude of a modulating component of the tunnel current due to vibration scanning in the direction of relative movement amount detection by the probe fluctuates in accordance with a shift between a scale line of the reference scale in the direction of relative movement amount detection and the probe. That is, an amplitude intensity of a modulation signal becomes the maximum when the probe is right above a scale line and the minimum when the probe is between scale lines, and it periodically fluctuates corresponding to a scale line. Then, on the basis of such information, the relative shift amount detection means detects a shift between scales line of said reference scale and the probe, and a detection signal therefrom is fed back so as to hold the probe above a scale line with the relative movement means.

Embodiments of the present invention will be described below with reference to the attached drawings.

Figure 3:
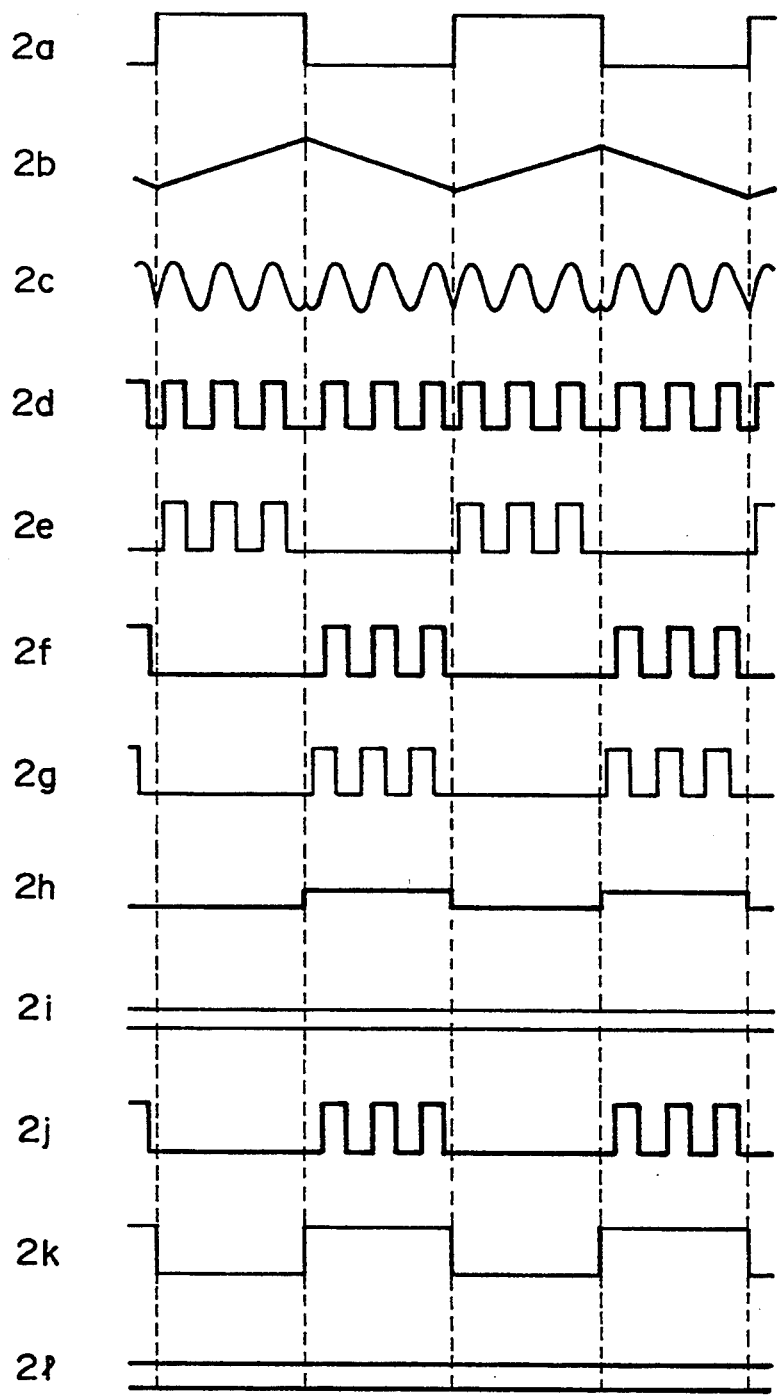
FIGS. 3, 4, 5A and 5B are views for explaining signal waves which are obtained in the components in FIGS. 2A and 2B.
Figure 4:
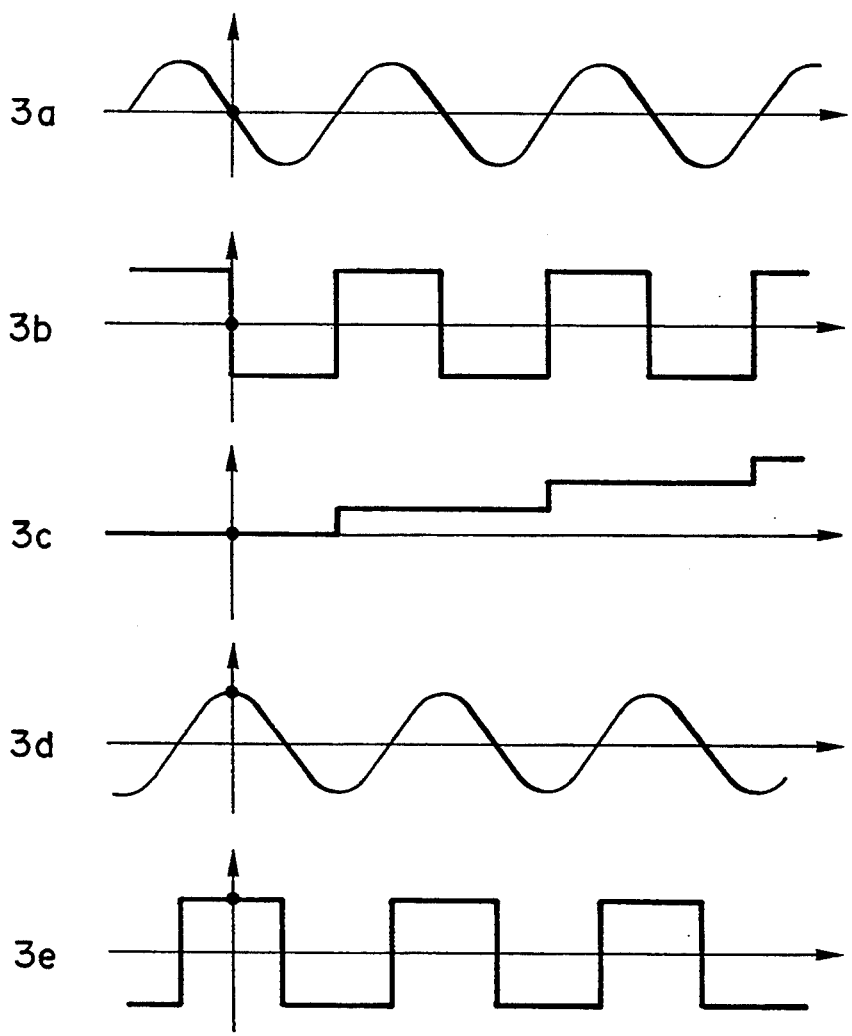

FIGS. 2A and 2B are a combined block diagram showing a structure of an encoder according to an embodiment of the present inveniton, and FIGS. 3, 4 and 5 show signals obtained in the parts of said encoder. FIG. 6 is a view illustrating probe driving means of said encoder.

In FIG. 2, numeral 1 denotes a cylindrical piezoelectric device for driving a probe, 2 a reference scale, and 3 a probe which is fixed to the tip end of the cylindrical piezoelectric device 1 and arranged to be relatively movable in a direction of detected relative movement (the X direction in this figure) with respect to the reference scale 2.

Figure 6A:
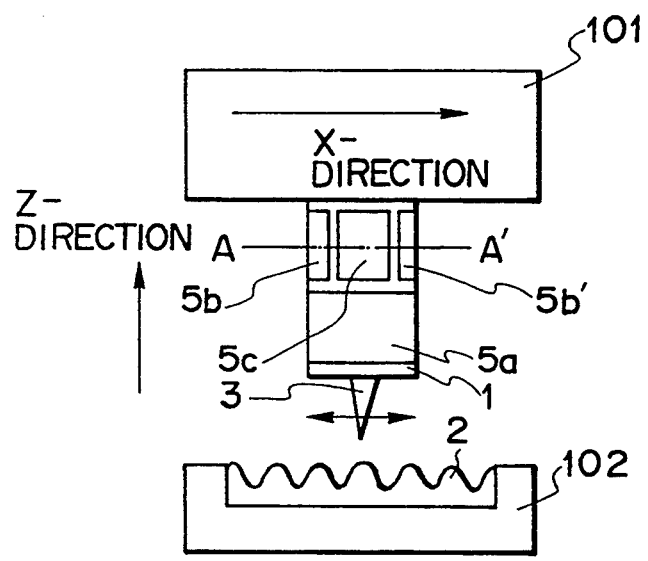
FIGS. 6A and 6B are views showing details of a probe driving portion in FIG. 1.
Figure 6B:
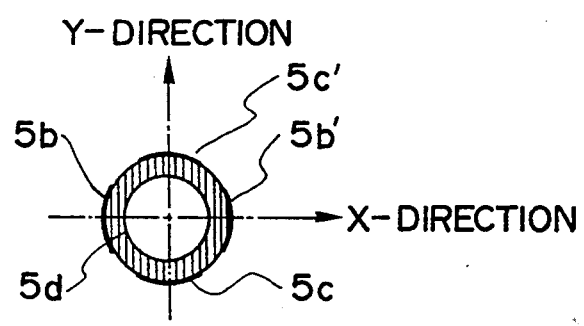

The cylindrical piezoelectric device 1 is fixed to an object 101 as shown in FIG. 6A, and said object 101 and another object 102 to which the reference scale 2 is fixed are movably supported reciprocally in the direction of detected relative movement (the X direction in this figure). Electrodes $5a$, $5b$, $5b'$, $5c$ and $5c'$ are formed on an outer periphery of the cylindrical piezoelectric device 1 in a pattern as shown in FIGS. 6A and 6B, while a uniform common electrode $5d$ is formed on an inner periphery as shown in FIG. 6B. When the voltage is applied, the electrode $5a$ expands and contracts in the Z direction in the figure so as to adjust a distance between the probe 3 and the reference scale 2. When a voltage of opposite polarity is applied to the electrodes $5b$ and $5b'$, one of the electrodes is expanded in the Z direction while the other is contracted in the Z direction so that the cylindrical piezoelectric device 1 is bent in the X direction and the probe 3 is driven in the X direction. In the similar way, when the voltage is applied to the electrodes $5c$ and $5c'$, the probe is driven in the Y direction.

Returning to FIG. 2, the bias voltage is applied between the probe 3 and the reference scale 2 by a bias electric power source 6 to bring them close to each other until the tunnel current runs between the tip end of the probe 3 and the reference scale 2. Said tunnel current is, after changed into a voltage by a current-voltage interchange circuit 7, logarithmically transformed by a logarithmic transformation circuit 8 as being in proportion to the distance between the probe and the reference scale. Then, by using an output signal therefrom, an average space is controlled to be constant in the relative movement of the probe 3 and the reference scale 2.

In other words, an output signal from the logarithmic transformation circuit 8 is input to an average tunnel current setting circuit 9 to detect an error signal with a specified tunnel current value to be a desired space, and then the control voltage is applied to the electrode $5a$ of the cylindrical piezoelectric device 1 via a low-pass filter 10 and an amplifier 11 on the basis of said detected signal. A cut-off frequency of the low-pass filter 10 is selected in such a manner as to eliminate a modulation component with a rapid tunnel current which is generated due to a fact that space between the probe and the reference scale is changed by convex portions of the reference scale when the probe 3 is vibrated for scanning in a relative movement direction with respect to the reference scale 2, so as to pass a direct current component of the tunnel current.

Thus, the probe 3 is driven and controlled in the Z direction by a portion corresponding to the electrode $5a$ of the cylindrical piezoelectric device 1 in such a manner as to keep the average distance from the reference scale 2 constant.

Next, a method and arrangement of detecting amount and a direction of relative movement in a direction of detected relative movement (the X direction) on the probe side and on the reference scale side will be described with reference to FIG. 2.

A rectangular wave at the oscillation frequency $f_1$ generated from a reference signal oscillator 12 is converted into a triangular wave such as a signal 2b in FIG. 3 by a triangular wave conversion circuit 13, amplified by an amplifier 14 and then applied to the electrodes 5b and 5b' of the cylindrical piezoelectric device 1. Thereby, the probe 3 is subject to the vibration scanning constantly in the direction of relative movement amount detection with the reference scale 2 at the oscillation frequency $f_1$ and with the amplitude d. However, said oscillation frequency $f_1$ must be set in such a manner that the oscillation speed is sufficiently higher than a relative movement speed on the probe side and on the reference scale side.

In this case, due to the vibration of the probe 3, a modulation component with the frequency $(2d/P)f_1$ (where P is a space between convex portions of the reference scale) appears for the tunnel current running between the probe and the reference scale. Said modulation component causes a phase shift in respect to a reference signal (such as a vibration scanning signal of the probe) when the probe and the reference scale relatively move in the detected relative movement direction. On this occasion, since one period of a signal of the modulation component is corresponding to one graduation of the reference scale, a relative movement amount on the probe side and on the reference scale side can be detected by detecting said phase shift.

Next, a manner of signal processing will be described with reference to FIG. 3 and FIG. 4.

The modulation component of the oscillation frequency $(2d/P)f_1$ which appears in the tunnel current is obtained as a signal 2c via the current-voltage interchange circuit 7, the logarithmic transformation circuit 8 and a band-pass filter 15, and then binarized by a binarizing circuit 16 to be a binarized signal 2d. Said binarized signal 2d is divided by an analog switch 17 into two signals 2e and 2f with reference to the signal 2a from the reference signal oscillator 12. Then the signal 2e is converted into a signal 2g which is delayed by a shift register 18 by the time $\frac{1}{2}f_1$ (corresponding to a half period of the reference signal $f_1$). It is because of comparing a phase difference due to reciprocation for vibration scanning of the probe. The signal 2f and the signal 2g are entered into a phase comparator 19 and a phase difference output signal 2h, which is output from the phase comparator 19, is averaged by an averaging circuit 20 to thereby obtain a signal 2i. On this occasion, if the probe and the reference scale relatively move in the detected relative movement direction, the signal 2f and the signal 2g are shifted in the opposite direction to each other so that the signal 2i is fluctuated in accordance with an amount of movement as the signal 3a in FIG. 4. Said signal 3a is binarized by a binarizing circuit 21 to generate a pulse signal 3b of FIG. 4, and by counting the number of pulses thereof by means of an up-down counter 22, a relative phase shift between the signal 2f and the signal 2g is digitally detected as a signal 3c of FIG. 4.

On this occasion, a relative movement direction signal entered into the up-down counter 22, i.e., an up-down condition will be obtained in the following manner.

A signal 2j having a phase shifted by 90° with respect to the signal 2g by a phase shifter 23 is generated, and the signal 2f and the signal 2j are input into a phase comparator 24 to obtain a phase difference output signal 2k. Then the phase difference output signal 2k is averaged by an averaging circuit 25 to obtain a signal 2l. Said signal 2l is, similar to the signal 2i, when the probe and the reference scale are relatively moved in the detected relative movement direction, changed according to said relative movement as a signal 3d in FIG. 4. Further, the signal 3d is binarized by a binarizing circuit to obtain an up-down signal 3e to be input into the updown counter 22.

In this embodiment, it is arranged that if the signal 3e is positive (+) at the rising point of pulse of the signal 3b, the number of pulses of the signal 3b is added by the up-down counter 22 and, if the signal 3e is negative (−), said number is subtracted. In other words, the detected relative movement direction along the X direction is effected.

As described in the foregoing, a relative movement amount in the detected relative movement direction on the probe side and on the reference scale side can be detected.

In addition, according to the method in this embodiment, one period of the phase shift ($2\pi$) is corresponding to a relative movement amount for a half graduation of the reference scale.

Figure 1A:
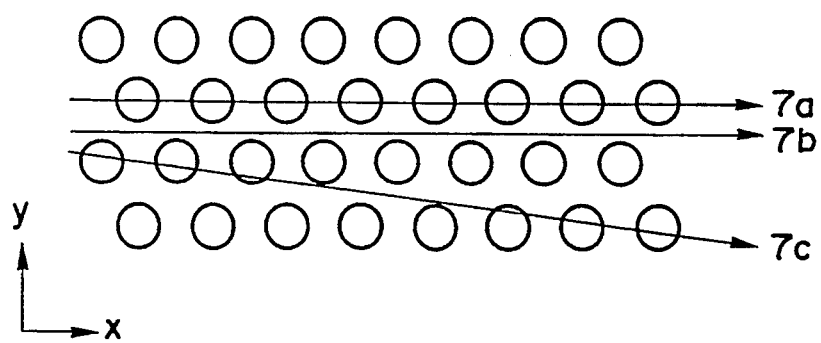
FIGS. 1A and 1B are views for explaining the prior art.
Figure 1B:
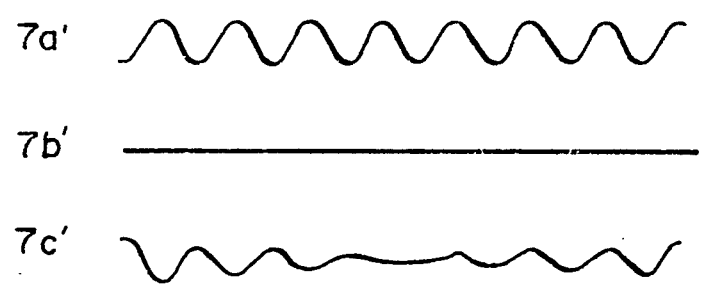

In the method of detection of a relative movement amount as described above, when the reference scale 2 employs a two-dimensional arrangement such as a crystal lattice, there is a probability for the probe to cross neighboring scale lines as described in FIG. 1, which may result in an error in the relative movement amount detection. Therefore, in the present embodiment, the probe 3 is controlled to follow one scale line of the reference scale 2.

Figure 5A:
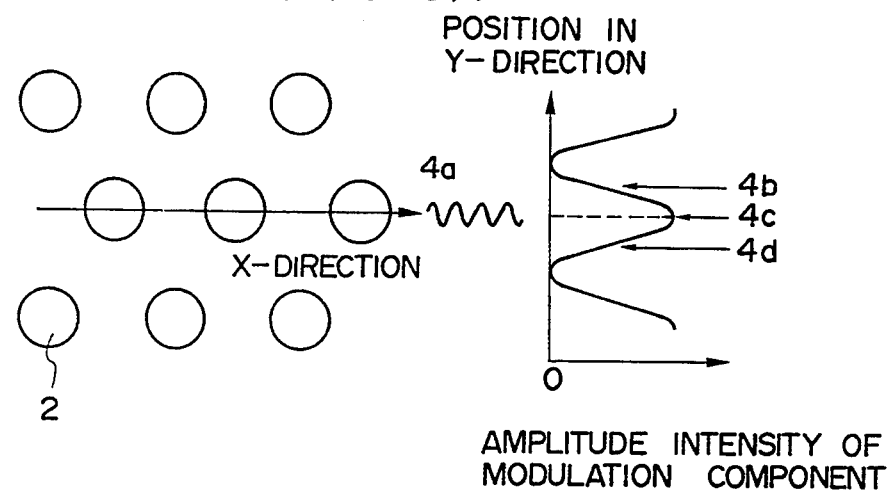
Figure 5B:
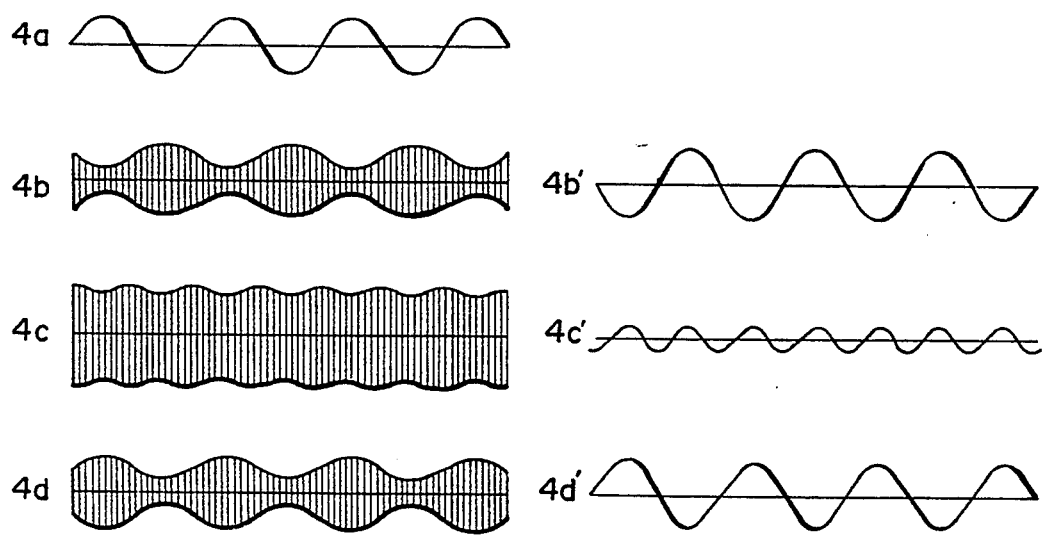

That is, in FIG. 2, the modulation component (the signal 2c in FIG. 3) with the frequency $(2d/P)f_1$ of the tunnel current due to the vibration scanning of the probe with the oscillation frequency $f_1$ in the direction of the relative movement amount detection is extracted via the logarithmic transformation circuit 8 and the band-pass filter 15. In this case, if the probe 3 is constantly vibrated in a direction perpendicular to the direction of detected relative movement with a fine amplitude at the oscillation frequency $f_2$ which is smaller than a width of a scale line of the reference scale 2 (where the oscillation frequency $f_2$ is set sufficiently small compared with the oscillation frequency $f_1$ in the direction of detected relative movement), an amplitude of the modulation component (the signal 2c in FIG. 3) changes according to a shift of the probe 3 in the Y direction from the scale lines arranged in the direction of detected relative movement (the X direction) as shown in FIG. 5A. That is, the amplitude intensity of the modulation signal is the maximum value when the probe is positioned right above a scale line and the minimum value when the probe is positioned between scale lines, and the amplitude intensity periodically fluctuates corresponding to a state of the scale lines as shown with a graph in FIG. 5A. In this case, if the probe 3 is finely vibrated at the oscillation frequency $f_2$ (the waveform 4a of FIG. 5B) in a direction perpendicular to the direction of detected relative movement, amplitudes of modulation components at the frequency $(2d/P)f_1$ are, as shown in FIG. 5B, different from one another when the respective centers of vibration in the Y direction are at the positions indicated by arrows with numerals corresponding to those in FIG. 5A, and an envelope is changed as signals 4b, 4c and 4d in FIG. 5B.

In this figure, since the modulation signal with the frequency $(2d/P)f_1$ which are generated whenever the probe passes each graduation have a sufficiently high frequency compared with the fine oscillation frequency $f_2$ of the probe 3, only an envelope of modulation components of such signal are shown. Therefore, signals of the envelop are, if taken out by full wave rectification, to be as signals $4b'$, $4c'$ and $4d'$ in FIG. 5B. That is, an envelop signal for a vibration waveform $4a$ of the probe 3 becomes small as the signal $4c'$ when the probe 3 is positioned right above a scale line as the arrow $4c$, and is phase-shifted by 180° in respect to a vibration waveform $4a$ with a larger amplitude when the probe 3 is shifted upwardly as the arrow $4b$, and then has the same phase as a vibration waveform $4a$ with a larger amplitude when the probe 3 is shifted downwardly as the arrow $4d$. Therefore, when phase detection is effected by the use of the reference signals with the oscillation frequency $f_2$ of the probe 3 as reference signals, a signal corresponding to a shift amount from a scale line of the reference scale 2 can be obtained, i.e., detection of a relative movement amount and a relative movement direction in the Y direction is effected here, such feed back control as keeping the probe 3 on a scale line is effected by the signal thus obtained.

A flow of the signals will be described with reference to FIG. 2.

A sine wave having the oscillation frequency $f_2$ generated in a reference signal oscillator 27 is applied to the electrodes $5c$ and $5c'$ of the cylindrical piezoelectric device 1 via an amplifier 28 and an adder 29, whereby the probe 3 is finely vibrated constantly in a direction perpendicular to the direction of detected relative movement.

On the other hand, a modulation component with the frequency $(2d/P)f_1$ running on the signal $2c$ from the band-pass filter 15 is rectified by a full wave rectifier 30 to be eliminated by a band-pass filter 31 so that only an envelop thereof is taken out to be input into a synchronous rectification circuit (phase detector) 32. Then the signal which is obtained by converting the reference signal with the oscillation frequency $f_2$ for finely vibrating the probe 3 into a rectangular signal by means of a waveform shaper 35 is used as a reference signal to effect synchronous rectification (phase detection). An output therefrom is smoothed by a low-pass filter 33 to obtain a signal which corresponds to an amount of a relative shift in the direction (the Y direction) perpendicular to the direction of relative movement amount detection (the X direction) between the probe 3 and the reference scale 2.

Said signal is, after passing an amplifier 34, added to a fine vibration signal in the Y direction of said probe 3 by the adder 29 to be applied to the electrodes $5c$ and $5c'$ of the piezoelectric device 1 as driving voltage, whereby the probe 3 is driven in the Y direction so as not to deviate from a scale line of the reference scale 2. Thus, it becomes possible to stably measure an amount of relative movement in the X direction without an error.

As described above, according to the present embodiment, an encoder, which uses an atomic configuration as a reference scale, detects a tunnel current running between a probe and the reference scale and detects a relative displacement between the probe and the reference scale. The probe is controlled to follow one scale line along a detected relative movement direction so that it becomes possible to correct a relative shift in a direction perpendicular to the detected relative movement direction due to a temperature drift of the apparatus, external vibration, non-linearity of a relative movement support mechanism, an error in angle setting of the reference scale, or the like, and to correctly and stably measure the relative movement amount.

The present invention is not limited to the above embodiment, but can be applied to other embodiments with proper variation.

For example, it is arranged in the foregoing embodiment that a cylindrical piezoelectric device is provided on the side of a probe so as to drive the probe in X, Y and Z direction. However, it is also possible to drive the probe in the respective directions by using separate driving devices. It is further possible to drive a reference scale side.

Figure 7:
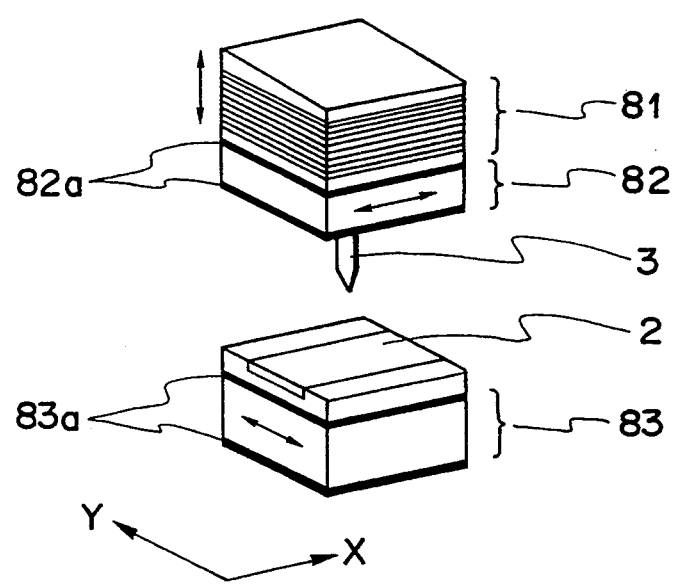
FIG. 7 is a view for explaining another embodiment of the present invention.

For example, in FIG. 7, numeral 81 denotes a laminate piezoelectric device for driving a probe 3 in the Z direction. A piezoelectric device 82 which uses a thickness sliding effect of a piezoelectric device is fixed to an end of the laminate piezoelectric device 81 so that the probe 3 is fixed to the piezoelectric device 82 for vibration scanning in the X direction. In this case, when voltage is applied to an electrode $82a$, the piezoelectric device 82 is displaced in a direction perpendicular to a direction of the electric field of the voltage (the direction indicated by an arrow in FIG. 7) to drive the probe 3 in the X direction. Further, the reference scale 2 is fixed to a piezoelectric device 83 which uses the thickness sliding effect like the piezoelectric device 82 to effect fine vibration in the Y direction. With such arrangement, it is possible to make the probe follow one scale line of the reference scale so as to stably measure a relative movement amount without errors, similar to the foregoing embodiment.

Furthermore, by controlling the probe to follow one scale line of the reference scale as in the present invention, an amount of relative movement in the direction perpendicular to the direction of detected relative movement can be also detected on the basis of an amount of such control.

What is claimed is:

1. A relative position change amount detecting apparatus for detecting a relative change in position between an object provided with a reference scale arranged in a predetermined direction and a probe, said apparatus, comprising:

a probe arranged opposite to the object for relative movement thereto;

means for applying a voltage between said probe and the object;

means for detecting a current flowing between said probe and the object upon applying the voltage;

first relative moving means for relatively moving the object and said probe such that said probe is repeatedly scanned to reciprocate along an arrangement direction of the reference scale;

first detecting means for detecting the amount of change in the relative position between said probe and the object on the basis of a detection result of said current detecting means;

second relative moving means for relatively moving the object and said probe such that said probe is vibrated along a surface of the object and in a direction transverse with the direction of scanning by said first relative moving means;

second detecting means for detecting a relative shift amount between said reference scale and said probe along the surface of the object and in the direction transverse with the direction of scanning by said first relative moving means on the basis of the detection result of said current detecting means; and means for moving the relative position between the object and said probe to compensate for the shift amount detected by said second detecting means.

2. An apparatus according to claim 1, wherein said current is a tunnel current.

3. An apparatus according to claim 1, wherein said first and second moving means are driven at the same time.

4. An apparatus according to claim 3, wherein a period of the reciprocative scanning by said first relative moving means is different from that of the vibration by said second relative moving means.

5. An apparatus according to claim 1, wherein said first detecting means further detects a relative movement direction between said probe and the object.

6. An apparatus according to claim 1, further comprising distance detecting means for detecting a distance between said probe and the object on the basis of the detection result of said current detecting means.

7. An apparatus according to claim 6, further comprising distance adjusting means for adjusting the distance between said probe and the object on the basis of a detecting result of said distance detecting means.

8. An apparatus according to claim 6, wherein said distance detecting means detects the distance between said probe and the object from a low frequency component of the detection result of said current detecting means.

* * * * *

UNITED STATES PATENT AND TRADEMARK OFFICE
CERTIFICATE OF CORRECTION

PATENT NO. : 5,432,346
DATED : July 11, 1995
INVENTOR(S) : Nose et al.

It is certified that error appears in the above-indentified patent and that said Letters Patent is hereby corrected as shown below:

SHEET 2:

FIG. 2A, "BOLTAGE" should read --VOLTAGE--.

SHEET 3:

FIG. 2B, "BINARIGING" should read --BINARIZING--.

COLUMN 3:

Line 60, "scales line" should read --scale lines--.

Signed and Sealed this

Sixteenth Day of January, 1996

Attest:

BRUCE LEHMAN

Attesting Officer

Commissioner of Patents and Trademarks